Patented Dec. 9, 1941

2,265,528

UNITED STATES PATENT OFFICE 2,265,528

CELLULOSE ESTERS

Rudolf Hofmann and Wilhelm Röhm, Dormagen, Germany, assignors to I. G. Farbenindustrie Aktiengesellschaft, Frankfort - on - the - Main, Germany No Drawing. Application November 26, 1938, Serial No. 242,571. In Germany December 1, 1937

4 Claims. (Cl. 260—227)

The present invention relates to the manufacture of cellulose esters.

It is known to produce esters of cellulose by the action of esterifying agents on cellulose, which may be suitably pretreated, in the presence of catalysts. The catalyst most usually employed is sulfuric acid. In this manner cellulose can be completely esterified to the triester stage. In many cases it is thereafter hydrolised to other stages of solubility, for instance to the acetone soluble stage. In cellulose esters produced in this manner high clarity is desirable, especially if they are to be worked up into transparent articles like films, transparent plates, safety glass etc. Now, there are processes for producing cellulose esters of high clarity using sulfuric acid as esterification catalyst, for instance the process of the U. S.—specification No. 2,126,190. We have found, however, that the clarity of cellulose esters produced according to such processes can be still improved in a very simple way which may be summarised as follows:

According to our invention, in the processes of producing cellulose esters, especially cellulose acetate, using sulfuric acid as esterification catalyst, a suitable amount of perchloric acid is added to the solutions of the cellulose ester at the earliest shortly before esterification is complete and, if the ester is to be hydrolised, hydrolysis is carried out in the presence of the perchloric acid. It is true that also perchloric acid has already been proposed as a catalyst in the esterification of cellulose. It is new, however, to add perchloric acid to cellulose ester solutions, which contain sulfuric acid as the main catalyst, shortly before esterification is complete, and also to hydrolise primary cellulose esters in the presence of both sulfuric acid and perchloric acid. Moreover, in esterifying cellulose according to a known method in the presence of perchloric acid alone, the resulting primary cellulose ester solutions are very inhomogeneous, still containing a great number of fibers, and even after hydrolysis in the presence of perchloric acid they are of insufficient clarity and transparency. It was very astonishing, therefore, that by adding perchloric acid to the usual cellulose ester solutions having been prepared in the presence of sulfuric acid, the clarity and transparency of the said ester solutions and of the esters themselves obtained therefrom could be improved.

The process according to our invention may be carried out in various ways. For instance, in the production of acetyl cellulose a small quantity of perchloric acid, for instance between about 0.1 to 0.5% calculated on the weight of the cellulose, may be added to the reaction mixture a short time before acetylation is complete, i. e. at a time, at which the major part of the cellulose is already acetylated. In this manner solutions of the primary cellulose acetate of improved clarity are obtained. Primary cellulose acetate precipitated from such solutions, if desired after short hydrolysis, yields with organic solvents solutions of extraordinary clarity which can be worked up into films or plates of relatively small light-absorption. If secondary cellulose acetates, for instance acetone soluble acetate, are to be prepared, perchloric acid may be added to the solution of the completely acetylated cellulose before hydrolysis begins in an amount sufficient for carrying out hydrolysis, for instance about 1 to 10%. In this case the two aforementioned modifications may also be combined, i. e. at first a small quantity of perchloric acid is added to the acetylation mixture before acetylation is complete, and thereupon hydrolysis is carried out by adding a sufficient quantity of sulfuric acid and/or of perchloric acid. In all cases cellulose ester solutions of higher clarity are obtained than if the process is carried out with either sulfuric acid or perchloric acid alone.

In all other respects esterification and hydrolysis may be carried out as usual. It has been found that hydrolysis can be effected at usual temperatures (40–60° C.) and within ordinary reaction times (5–15 hours) in the presence of smaller quantities of perchloric acid than the quantities of sulphuric acid hitherto used in hydrolysis. It is also worth mentioning that besides the improvement of the optical properties of the cellulose esters, also their stability and temperature resistance in the hydrolised state is improved. Furthermore, since the acid concentration during hydrolysis can be lowered, as above stated, end products of higher viscosity can be obtained.

As is apparent from the foregoing description of our process, our invention can be employed in the production of acetyl cellulose as well as of other pure and mixed esters of cellulose. It is also obvious that the perchloric acid, instead of being added directly, may be produced in the cellulose ester solution from a perchlorate and another strong acid.

The following examples illustrate the invention, without, however, restricting it thereto, the parts being by weight.

Example 1

100 parts of cellulose, for instance bucked and bleached cotton linters, are pretreated in the usual manner with glacial acetic acid so that they still contain 60 parts of glacial acetic acid. Thereupon they are acetylated in the usual manner with a reaction mixture consisting of 300 parts of acetic acid anhydride, 430 parts of methylene chloride and 1 part of sulfuric acid. After acetylation is complete and after adding at least 25 parts of water for destroying the excess acetic acid anhydride, 8 parts of 70% aqueous perchloric acid are added and hydrolysis is carried out at about 50° C., until the desired solubility is obtained. After neutralisation of the sulfuric and perchloric acid present, the secondary cellulose acetate is worked up in the usual manner. A highly viscous and stable acetyl cellulose giving especially transparent solutions is obtained.

Example 2

100 parts of bucked and bleached cotton linters are pretreated with glacial acetic acid so that they contain 50 parts of glacial acetic acid. Thereupon they are acetylated in the usual manner with a reaction mixture, consisting of 255 parts of acetic acid anhydride, 400 parts of methylene chloride and 1 part of sulfuric acid. Shortly before the esterification is complete, when the cellulose is esterified to about 95%, 0.2 parts of a 70% aqueous perchloric acid, dissolved in 25 parts of acetic acid anhydride, are added to the reaction mass. An especially clear, fiberless, homogeneous crude solution of primary cellulose acetate of normal viscosity is obtained. After destroying the excess acetic acid anhydride and neutralizing, this crude solution may be used directly for the manufacture of threads or films or may be worked up into solid cellulose triacetate, or the crude solution may be hydrolised after addition of 5 parts of a 70% aqueous perchloric acid at a temperature of 60° C. until the desired esterification stage is reached. In all cases highly viscous and stable acetyl cellulose giving especially clear solutions is obtained.

Example 3

100 parts of bucked and bleached cotton linters are pretreated with 33 parts of glacial acetic acid. Thereupon they are esterified in the usual manner with a reaction mixture consisting of 400 parts of ethylene chloride, 280 parts of acetic acid anhydride, 100 parts of butyric acid and 0.5 part of sulfuric acid. After raising the temperature in the course of 4 hours, calculated from the beginning of the reaction, to about 50° C., 0.2 part of a 70% aqueous perchloric acid, dissolved in 25 parts of acetic acid anhydride are added to the reaction mass and the esterification is completed at this temperature. An especially clear soluble, fiberless, inhomogeneous crude solution of normal viscosity is obtained. After destroying the excess acetic acid anhydride and neutralizing, the crude solution may be worked up. The crude solution may also be hydrolised after addition of 5 parts of a 70% perchloric acid at a temperature of 50° C. until the desired esterification stage is reached. In all cases highly viscous, stable cellulose acetobutyrate yielding especially clear solutions is obtained.

We claim:

1. A process of producing an organic cellulose ester of improved clarity and transparency which comprises treating cellulose with a lower fatty acid esterifying agent in the presence of sulfuric acid as a catalyst, adding perchloric acid to the reaction mixture at a time at which the major part of the cellulose is acylated in an amount sufficient to yield a clear, transparent solution of the finished reaction product, completing the esterification treatment, and isolating the ester from the reaction mixture.

2. In the process of producing organic cellulose esters as claimed in claim 1, the modification which comprises adding perchloric acid to the esterification solution of the cellulose ester shortly before esterification is complete, and after completion of the esterification hydrolyzing the cellulose ester with a hydrolyzing agent containing perchloric acid.

3. In the process of producing organic cellulose esters as claimed in claim 1, the modification which comprises adding perchloric acid to the solution of the completely esterified cellulose and hydrolyzing the cellulose ester with a hydrolyzing agent containing perchloric acid.

4. In the process of producing organic cellulose esters as claimed in claim 1, the modification which comprises adding a portion of the perchloric acid to the esterification solution of cellulose acetate shortly before esterification is complete, and adding a further portion of perchloric acid before hydrolysis begins.

RUDOLF HOFMANN.
WILHELM RÖHM.